United States Patent [19]

Burandt

[11] Patent Number: 4,760,964
[45] Date of Patent: Aug. 2, 1988

[54] ACTUATOR SYSTEM FOR JET NOZZLE FLAP

[75] Inventor: Wesley A. Burandt, Rockford, Ill.

[73] Assignee: Sundstrand Corporation, Rockford, Ill.

[21] Appl. No.: 925,418

[22] Filed: Oct. 31, 1986

[51] Int. Cl.$^4$ .............................................. B64D 33/04
[52] U.S. Cl. ........................... 239/265.19; 239/265.35; 74/750 R
[58] Field of Search ...................... 74/750 R, 801, 804, 74/805; 239/265.19, 265.33, 265.35, 265.37; 244/213-215

[56] References Cited

U.S. PATENT DOCUMENTS

| | | | |
|---|---|---|---|
| 3,008,355 | 1/1961 | Grudin | 74/801 |
| 3,100,377 | 8/1963 | Kosin et al. | 239/265.19 |
| 3,203,275 | 8/1965 | Hoover | 74/801 X |
| 3,640,150 | 2/1972 | Leiner et al. | 74/674 |
| 3,727,759 | 4/1973 | Elis | 239/265.2 A |
| 4,136,580 | 1/1979 | Brand et al. | 74/410 X |
| 4,181,260 | 1/1980 | Nash | 239/265.3 A |
| 4,304,152 | 12/1981 | Michling | 74/705 |
| 4,357,840 | 11/1982 | Winzeler | 74/705 X |
| 4,423,644 | 1/1984 | Coutant | 74/710 |
| 4,430,909 | 2/1984 | Magnuson | 74/705 |
| 4,441,675 | 4/1984 | Boehringer et al. | 244/213 |
| 4,529,130 | 7/1985 | Szuminski et al. | 239/265.19 |

OTHER PUBLICATIONS

"Geared Rotary Hydraulic Actuators for the General Electric A9/Vectoring Flap Demonstrator Engine Program" A Document (Proposal E 2951-P1, vol. 1 Tech RFP 790-04305-1) of Sandstrand Aviation Mech Unit, Rockford Ill.

Primary Examiner—Andres Kashnikow
Assistant Examiner—Kevin P. Weldon
Attorney, Agent, or Firm—Wood, Dalton, Phillips, Mason & Rowe

[57] ABSTRACT

In order to enhance performance of an aircraft while at the same time utilizing redundant aircraft hydraulic power in an efficient manner, an actuator system for a nozzle flap of an aircraft engine is provided. The actuator system includes a power drive unit in operatively associated relation with drive transmitting gearing at a single location together with an actuator driven by the power drive unit through the drive transmitting gearing, and the actuator includes output drive gearing operatively associated with the nozzle flap for driving the nozzle flap at spaced apart locations. With this arrangement, the nozzle flap is driven at spaced apart locations by the power drive unit from a single location through the actuator to permit downsizing of components with consequent weight reduction to achieve enhanced performance.

15 Claims, 6 Drawing Sheets

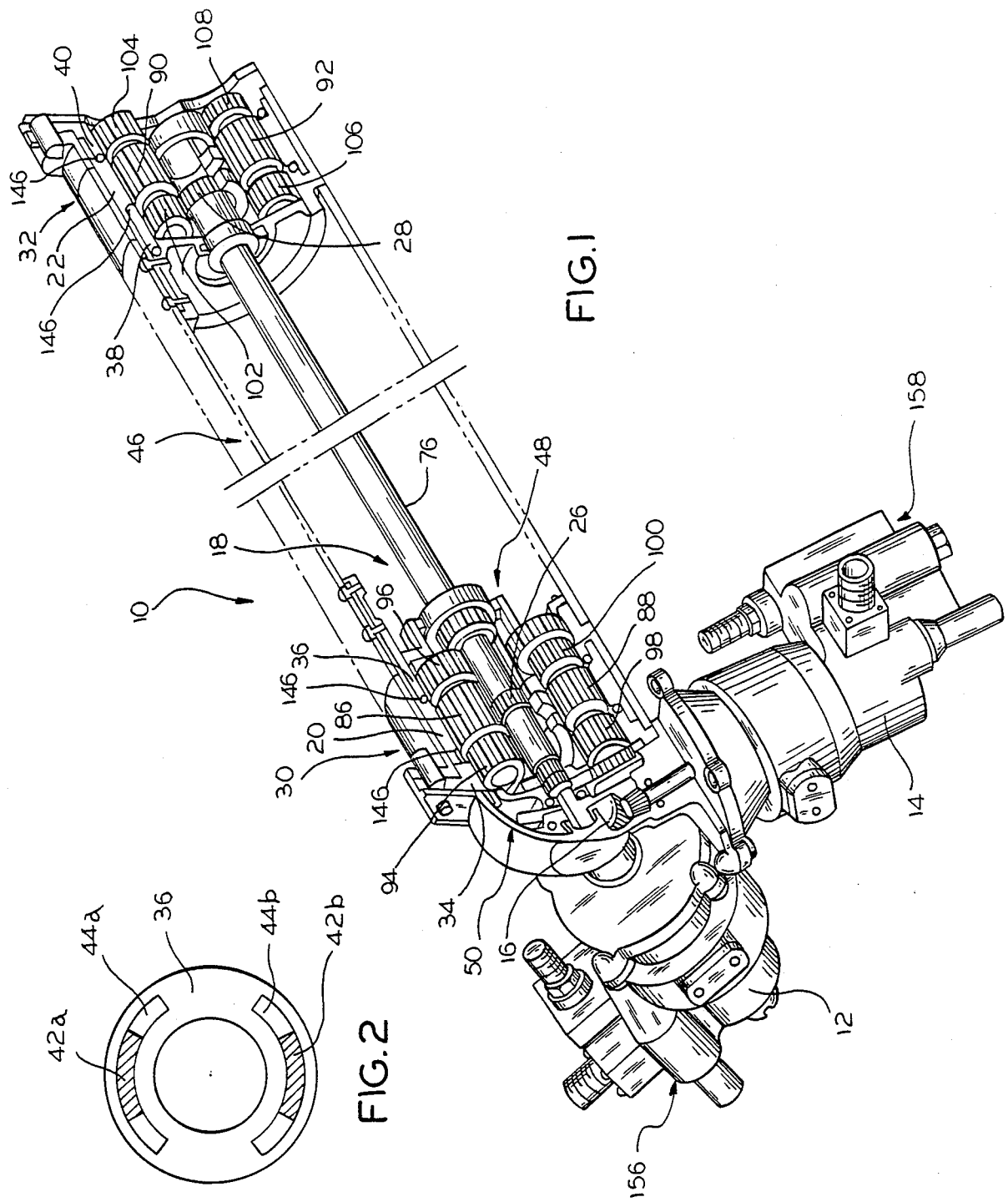

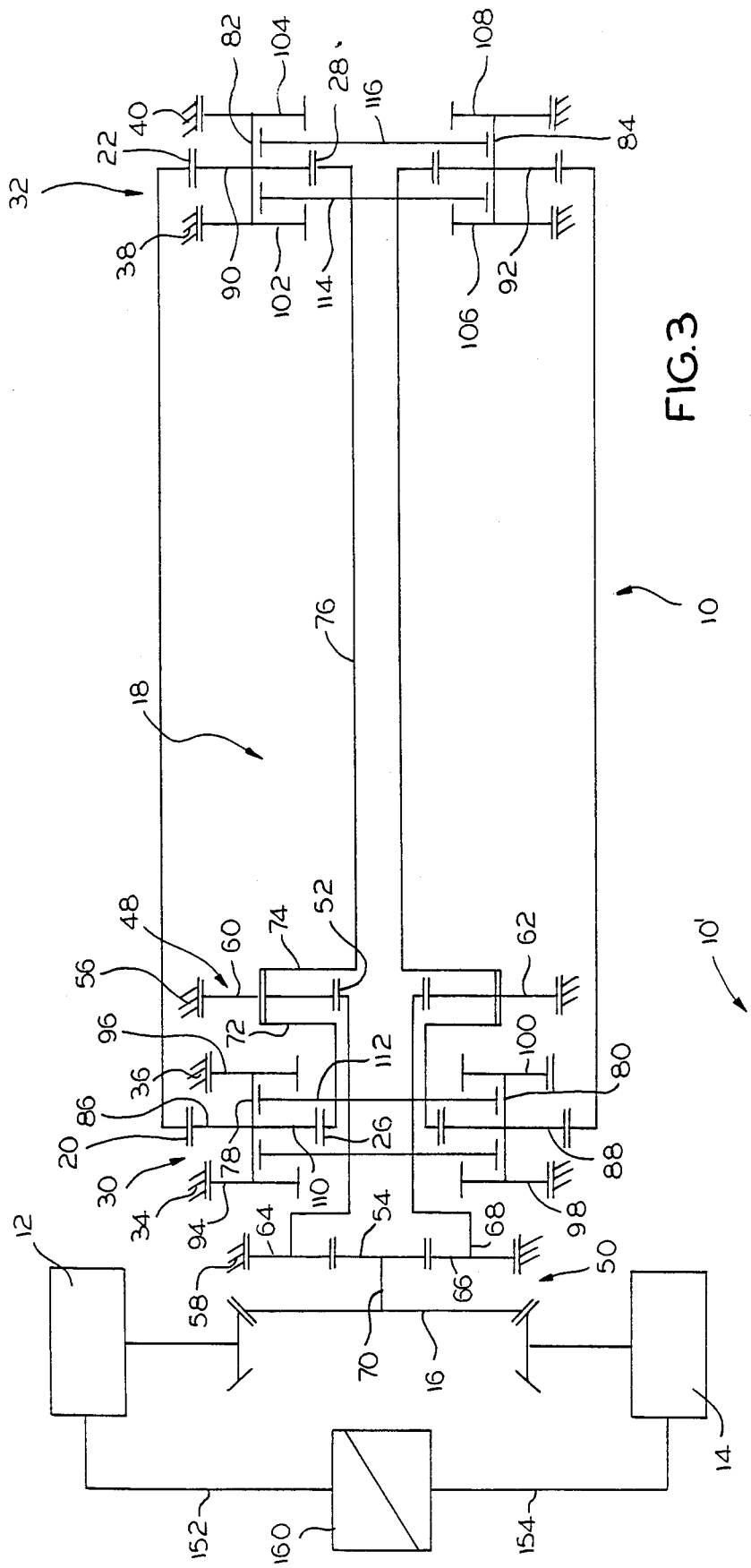

ACTUATOR SYSTEM FOR JET NOZZLE FLAP

FIELD OF THE INVENTION

The present invention relates to actuator systems and, more particularly, to an actuator system for a movable surface such as a nozzle flap of an aircraft engine.

BACKGROUND OF THE INVENTION

Aircraft such as the ones commonly utilized in military applications have demanding performance requirements. To meet these requirements, primary flight control surfaces such as the exhaust nozzle system which provides thrust vectoring of engine exhaust are being incorporated for increased maneuvering capability. To provide thrust vectoring, the primary flight control surface at the aft end of the engine generally consists of two nozzle flap panels each mounted to tube supports which in turn are mounted on bearings within the engine wall structure. With this arrangement, engine exhaust passes over the tube supports and is diverted by the nozzle flap panels.

On fighter aircraft that have two engines there is a desire to position the engines side-by-side. Moreover, it is highly desirable to position the engines as close together as possible to minimize aerodynamic drag and imposing asymmetric thrust upon the aircraft in the event of a single engine out condition, but one of the constraints of positioning the two engines side-by-side is at the end of the tube support for the nozzle flap panels. In this connection, envelope restrictions are imposed by the engine cowling.

Conventionally, a flight control surface such as a nozzle flap panel is operated by attaching a bell-crank to either end of the tube support. This bell-crank is then driven by linear hydraulic cylinders and, since the nozzle flap panels would be considered primary flight control surfaces, hydraulic redundancy is required. As a result, each nozzle flap panel is usually driven by tandem linear hydraulic cylinders.

Due to the envelope restriction on the inboard end of the tube support for the nozzle flap panels, the conventional solution requires the drive means to be located at one end only, e.g., the outboard end. However, driving from one end only, e.g., the outboard end, the tube support for the nozzle flap panels must be designed to be stiffer which adds weight that is undesirable due to its adverse effect on performance.

Accordingly, it has remained to provide a satisfactory actuation system that drives both ends of the tube support for the nozzle flap panels. This must be done, however, in a manner which reduces weight while also meeting the envelope restrictions and, preferably, by converting redundant aircraft hydraulic power into mechanical power utilized for driving the nozzle flap panels. Additionally, it would be highly desirable for the actuation system to be an integral part of the tube support buried within the engine exhaust area to facilitate maintainability considerations.

Among the prior attempts to provide actuation systems of various types is that disclosed in Boehringer et al U.S. Pat. No. 4,441,675 directed to a drive system for high-lift devices on aircraft having two power drive units arranged so as to force sum the outputs. However, the Boehringer et al '675 patent provides one of the power drive units at each end of a connecting torque tube system and entirely fails to even suggest an actuation system that is an integral part of the tube support for a nozzle flap panel.

Among various other actuation systems, planetary gearing, and power transmitting systems are those disclosed in Magnuson U.S. Pat. Nos. 4,430,909, Coutant 4,423,644, Winzeler 4,357,840, Michling 4,304,152, Nash 4,181,260, and Brand et al 4,136,580, although none of these patents is directed to an actuator system for a control surface such as a nozzle flap of an aircraft engine.

As a result, it has remained to overcome the above stated problems and accomplish the stated objects by providing an entirely new type actuator system.

SUMMARY OF THE INVENTION

Accordingly, the present invention is directed to an actuator system for a movable surface such as a nozzle flap of an aircraft engine. The actuator system includes power drive means in operatively associated relation with drive transmitting means at a single location. It also includes actuator means driven by the power drive means through the drive transmitting means. The actuator means includes output drive means operatively associated with the nozzle flap for driving the nozzle flap at spaced apart locations. With this arrangement, the nozzle flap can be driven at spaced apart locations by the power drive means from a single location through the actuator means.

In an exemplary embodiment, the power drive means includes a pair of power drive units disposed at a single location and the drive transmitting means includes drive transmitting gearing operatively connected to each of the power drive units. Advantageously, the actuator means comprises a geared rotary actuator having a pair of axially spaced input gears operatively connected to the power drive units through the drive transmitting gearing. Moreover, the geared rotary actuator preferably includes an output gear operatively connected to each of the input gears and the output gears comprise the output drive means operatively associated with the nozzle flap.

Still more specifically, the actuator means preferably comprises a pair of axially spaced differential planetary output stages. The differential planetary output stages, which comprise the output drive means or gears operatively associated with the nozzle flap, advantageously have a center output ring gear drivingly interconnected to the nozzle flap. Additionally, the differential planetary output stages also each have a pair of outer fixed ring gears disposed about the center output ring gear.

In a preferred embodiment, the power drive units comprise hydraulic motor valve packs and the drive transmitting gearing comprises a bevel gear set. With this arrangement, the hydraulic motor valve packs are advantageously operatively connected to an aircraft hydraulic power system and the geared rotary actuator is constructed such that a pair of axially spaced input gears are operatively connected to the hydraulic motor valve packs through the bevel gear set and are each also operatively connected to one of the axially spaced differential planetary output stages for driven movement of the nozzle flap through the center output ring gears. With this construction, the geared rotary actuator converts hydraulic power from the aircraft hydraulic power system to mechanical power driving the nozzle flap.

Preferably, the actuator system also includes a tubular support for the nozzle flap of the aircraft engine with the center output ring gears and the outer fixed ring gears of the geared rotary actuator defining the tubular support. Also, the center output ring gears and tube support are supported relative to the outer fixed ring gears on ball bearings. Still additionally, each of the differential planetary output stages is preferably formed such that one of the outer fixed ring gears and the center output ring gear have an arrangement consisting of a fork extending through an arcuate slot to define means for transmitting torque from the center output ring gear to the tubular support across a single fixed outer ring gear.

In another preferred embodiment, the actuator system includes a pair of power drive units with each of the power drive units being disposed within a tube support for the nozzle flap intermediate the ends so as to be drivingly interconnected with one of the differential planetary output stages. This is achieved through separate drive transmitting gearing and simple planetary input stages with the drive transmitting gearing including a drive gear operatively associated with each of the power drive units and a driven gear operatively associated with each of the drive gears such that each of the driven gears is drivingly interconnected with a sun gear of the corresponding one of the simple planetary input stages through a torque tube. Furthermore, each of the simple planetary input stages preferably also includes a plurality of planet gears disposed between the sun gear and a fixed ring gear and further includes a planetary carrier operatively connected to a sun gear of the corresponding one of the differential planetary output stages.

Still further, each of the differential planetary output stages preferably also includes a plurality of planet gear shafts each carrying a center planet gear and a pair of outer planet gears. Each of the center planet gears is advantageously disposed in drivingly interconnected relationship with the respective ones of the sun gears and the center output ring gears and each of the pairs of outer planet gears is advantageously disposed in drivingly interconnected relationship with the respective ones of the pairs of outer fixed ring gears. Moreover, a support ring is preferably disposed on either side of each of the center planet gears inwardly of the respective ones of the outer planet gears to maintain the planet gears in drivingly interconnected relationship with the ring gears.

Other objects, advantages and features of the present invention will become apparent from the following specification taken in conjunction with the accompanying drawings.

BRIEF DESCRIPTION OF THE DRAWINGS

FIG. 1 is a perspective view, partially cut away, illustrating an actuation system in accordance with the present invention;

FIG. 2 is a cross-sectional view illustrating means for transmitting torque from the center output ring gear to the tubular support across a single fixed outer ring gear of a nozzle flap of an aircraft engine;

FIG. 3 is a schematic diagram of one geared rotary actuator for use in an actuation system of the type illustrated in FIG. 1;

FIG. 4 is a block diagram illustrating the relationship of FIGS. 4A and 4B;

DETAILED DESCRIPTION OF THE PREFERRED EMBODIMENTS

Figure 4A:
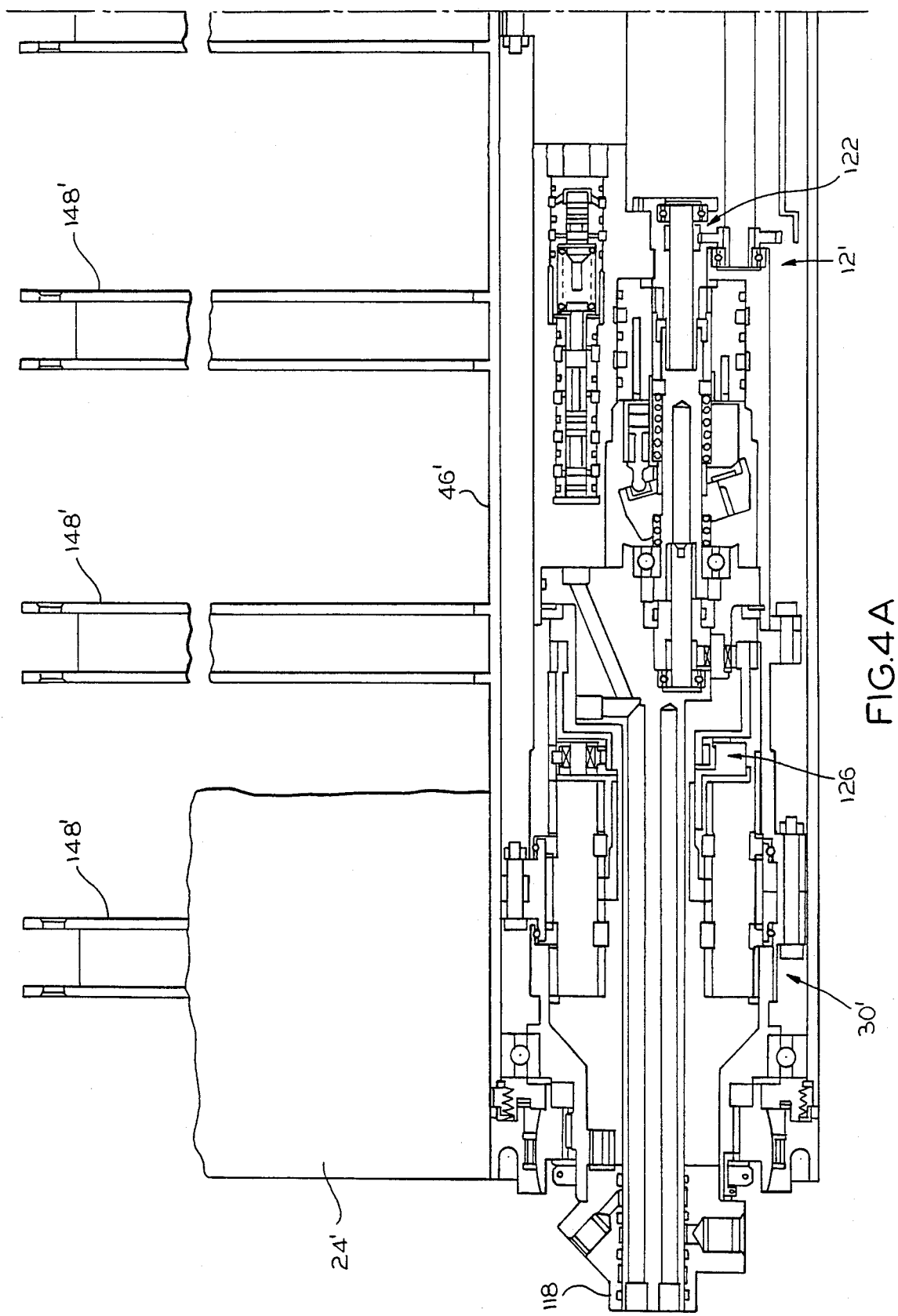
FIG. 4A is a cross-sectional view illustrating a portion of another form of actuation system in accordance with the present invention.

An exemplary embodiment of an actuator system 10 in accordance with the invention is illustrated in FIGS. 1 and 3 and includes power drive means such as the power drive units 12 and 14 in operatively associated relation with drive transmitting means such as the drive transmitting bearing 16 at a single location. It also includes actuator means such as the geared rotary actuator 18 driven by the power drive units 12 and 14 through the drive transmitting bearing 16, and the geared rotary actuator 18 includes output drive means such as the output gears 20 and 22 operatively associated with a movable surface such as a nozzle flap 24 for driving the movable surface or nozzle flap 24 at spaced apart locations (see, also, FIG. 7). With this arrangement, the movable surface or nozzle flap 24 is driven at spaced apart locations corresponding to the output drive means or gears 20 and 22 by the power drive means or units 12 and 14 from a single location corresponding to the drive transmitting gearing 16 through the geared rotary actuator 18.

As mentioned, the power drive means includes a pair of power drive units 12 and 14 operatively connected to the drive transmitting gearing 16 at a single location. It will also be seen by referring to FIGS. 1 and 3 that the geared rotary actuator 18 has a pair of axially spaced input gears 26 and 28 operatively connected to the power drive units 12 and 14 through the drive transmitting gearing 16. As will be described hereinafter, the output gears 20 and 22 are operatively connected to the corresponding input gears 26 and 28 for driven movement of the nozzle flap 24.

Still referring to FIGS. 1 and 3, the geared rotary actuator 18 comprises a pair of axially spaced differential planetary output stages generally designated 30 and 32 which are formed of gearing which includes the output gears 20 and 22, respectively, and the input gears 26 and 28, respectively. As shown, the differential planetary output stages 30 and 32 each include not only a center output ring gear 20 and 22, respectively, drivingly interconnected to the nozzle flap 24, but also include a pair of outer fixed ring gears 34, 36 and 38, 40, respectively, disposed about the center output ring gears 20 and 22.

As will be clear from the foregoing, each of the axially spaced input gears 26 and 28 is operatively connected to one of the axially spaced output gears 20 and 22 for driven movement by the power drive units 12 and 14 through the drive transmitting bearing 16. It will also be clear that each of the axially spaced output gears 20 and 22 comprises a portion of the differential planetary output stages 30 and 32 and that each of the differential planetary output stages 30 and 32 includes a pair of outer fixed ring gears 34, 36 and 38, 40 disposed about a center movable output ring gear 20 and 22. Because of the arrangement of the operative components, the power drive units 12 and 14 can both be located at the outboard end of the engine exhaust area and can still drive the nozzle flap 24 at opposite ends thereof.

Since the differential planetary output stages 30 and 32 are operatively associated with opposite ends of the nozzle flap 24, they are disposed in axially spaced relation to one another. Thus, the various components can be downsized to reduce weight and thereby improve performance because of the fact that the driving forces are applied at opposite ends of the nozzle flap 24.

As best shown in FIG. 2, means are provided for transmitting torque from center output ring gear to the tubular support across a single fixed outer ring gear. The torque transmitting means preferably includes a fork 42a extending through an arcuate slot 44a and, preferably, including a second fork 42b extending through a second arcuate slot 44b, with the respective forks 42a and 42b and arcuate slots 44a and 44b circumferentially spaced apart by approximately 180°, and the relationship between the arcuate width of the forks 42a and 42b and the length of the slots 44a and 44b will define the amount of movement of the nozzle flap 24. In this connection, the forks 42a and 42b are provided on the center output ring gears 20 and 22 and the outer fixed ring gears 36 and 38 with the arcuate slots 44a and 44b being provided in the outer fixed ring gears 36 and 38.

In the embodiment illustrated in FIGS. 1 through 3, the forks 42a and 42b are provided on the center output ring gears 20 and 22 and the arcuate slots 44a and 44b are provided in the outer fixed ring gears 36 and 38, respectively.

In a preferred embodiment, the power drive units 12 and 14 comprise hydraulic motor valve packs, the drive transmitting gearing 16 comprises a bevel gear set, and the hydraulic motor valve packs 12 and 14 are operatively connected to an aircraft hydraulic power system in conventional fashion. The input gears 26 and 28 are operatively connected to the hydraulic motor valve packs 12 and 14 through the bevel gear set 16. Since the input gears 26 and 28 are operatively connected to the nozzle flap 24 through the center output ring gears 20 and 22, the geared rotary actuator 18 is adapted to convert hydraulic power from the aircraft hydraulic power system to mechanical shaft power driving the nozzle flap 24.

As will be appreciated by referring to FIG. 1, the center output ring gears 20 and 22 and the outer fixed ring gears 34, 36 and 38, 40 of the geared rotary actuator 18 define a tubular support generally designated 46. The tubular support 46 with which the outer fixed ring gears 34, 36 and 38, 40 are integral supports the nozzle flap 24 of the aircraft engine and carries the geared rotary actuator 18 in the manner illustrated in FIG. 1. Because of the self-contained nature of the geared rotary actuator 18, it is possible to remove the entire tubular support 46 for repair by removing mounting pins (not shown).

Referring once again to FIG. 3, it will be seen that each of the differential planetary output stages 30 and 32 is driven by a simple planetary input stage 48. The simple planetary input stage 48 comprises a portion of the geared rotary actuator 18 and is operatively connected to the power drive units 12 and 14 through the drive transmitting gearing or bevel gear set 16. Preferably, a second simple planetary input stage 50 is operatively connected to the simple planetary input stage 48 in the manner illustrated.

More specifically, the simple planetary input stages 48 and 50 preferably each include a sun gear 52 and 54, respectively, and a fixed ring gear 56 and 58, respectively, together with a plurality of planet gears such as 60, 62 and 64, 66, respectively, disposed therebetween. The sun gear 52 of the simple planetary input stage 48 is then operatively connected to the planet gears such as 64, 66 of the second simple planetary input stage 50 through a planetary carrier 68 therefor. The sun gear 54 of the second simple planetary input stage 50 is preferably operatively connected to the bevel gear set 16 through a shaft 70. The simple planetary input stage 48 also preferably includes a planetary carrier 72 operatively connected to the sun gear 26 of one of the differential planetary output stages 30 in a direct integral fashion. The simple planetary input stage 48 also preferably includes a planetary carrier 74 operatively connected to the sun gear 28 of the other of the differential planetary output stages 32 through a torque tube 76. With this arrangement, each of the differential planetary output stages 30 and 32 still further preferably include a plurality of planet gear shafts such as 78, 80 and 82, 84, respectively.

As will be appreciated, the planet gear shafts such as 78, 80 and 82, 84 each carry center planet gears such as 86, 88 and 90, 92 and respective pairs of outer planet gears such as 94, 96; 98, 100 and 102, 104; 106, 108. Each of the center planet gears such as 86, 88 and 90, 92 are disposed in drivingly interconnected relationship with the respective ones of the sun gears 26 and 28, respectively, and the center output ring gears 20 and 22, respectively, and each of the respective pairs of outer planet gears 94, 96; 98, 100 and 102, 104; 106, 108, respectively, are disposed in drivingly interconnected relationship with the respective ones of the pairs of outer fixed ring gears 34, 36 and 38, 40, respectively. Moreover, a support ring 110, 112 and 114, 116 is disposed on either side of the center planet gears inwardly of the corresponding ones of the outer planet gears to maintain the planet gears in drivingly interconnected relationship with the ring gears.

In another preferred embodiment illustrated in FIGS. 4, 4A, 4B, and 6, the actuator system 10' includes a pair of power drive units 12' and 14' disposed within the tube support 46' for the nozzle flap 24' intermediate the ends 118 and 120 thereof. It will be seen and appreciated by those skilled in the art that the power drive units 12' and 14' are interconnected to one another and are each drivingly interconnected with one of the differential planetary output stages 30' and 32' of the actuator means or geared rotary actuator 18' through separate simple planetary input stages 126 and 128. As will be appreciated from FIG. 6, the drive transmitting gearing such as 124 includes a drive gear such as 130 operatively associated with the corresponding one of the power drive units such as 14' and a driven gear 132 operatively associated with the corresponding one of the drive gears such as 130. It will also be seen and appreciated that each of the driven gears such as 132 are, in turn, drivingly interconnected with a sun gear such as 134 of the corresponding one of the simple planetary input states such as 128 through a torque such as 136. Moreover, each of the simple planetary input stages such as 128 also includes a plurality of planet gears such as 138 and 140 disposed between the sun gear such as 134 and a fixed ring gear such as 142.

Figure 6:
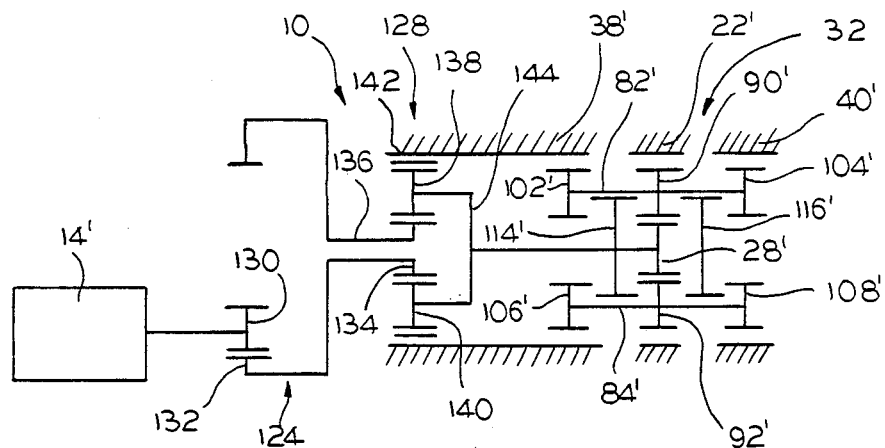
FIG. 6 is a schematic diagram of another geared rotary actuator for use in an actuation system of the type illustrated in FIG. 4.

Still referring to FIG. 6, it will be appreciated that each of the simple planetary input stages such as 128 further includes a planetary carrier such as 144 operatively connected to a sun gear such as 28' of the corresponding one of the differential planetary output stages such as 32'. Each of the differential planetary output stages such as 32' also includes a plurality of planet gear shafts such as 82' and 84' each carrying a center planet gear such as 90' and 92' and a pair of outer planet gears such as 102', 104' and 106', 108' with each of the center planet gears such as 90', 92' being disposed in drivingly interconnected relationship with the respective ones of the sun gears such as 28' and the center output ring gears such as 22' and each of the pairs of outer planet gears such as 102', 106' and 104', 108' being disposed in drivingly interconnected relationship with the respective ones of the pairs of outer fixed ring gears such as 38' and 40', respectively. As with the embodiment illustrated in FIGS. 1 and 3, a support ring such as 114' and 116' is disposed on either side of each of the center planet gears inwardly of the corresponding ones of the outer planet gears to maintain the planet gears in drivingly interconnected relationship with the ring gears.

Still another feature of the present invention can be understood by again referring to FIG. 1. It will there be seen that the center output ring gears 20 and 22 and the tube support 46 are supported relative to the outer fixed ring gears 34, 36 and 38, 40 on ball bearings as at 146 to reduce the friction and increase the efficiency of the moving components of the actuator system 10. By incorporating ball bearings rather than supporting the ring gears on sliding bushings, losses due to friction are reduced to a significant extent.

With this construction, the ball bearings 46 react to both the radial and axial loads imposed on the actuator system. They are axially preloaded through the actuator system with the pre-load being a design feature that keeps the hinge bearings for the nozzle flap tracking at a uniform contact angle through 360°. In this connection, the amount of pre-load required is determined from the calculated moment loading imposed by the output arms plus the imposed shear load.

Figure 4B:
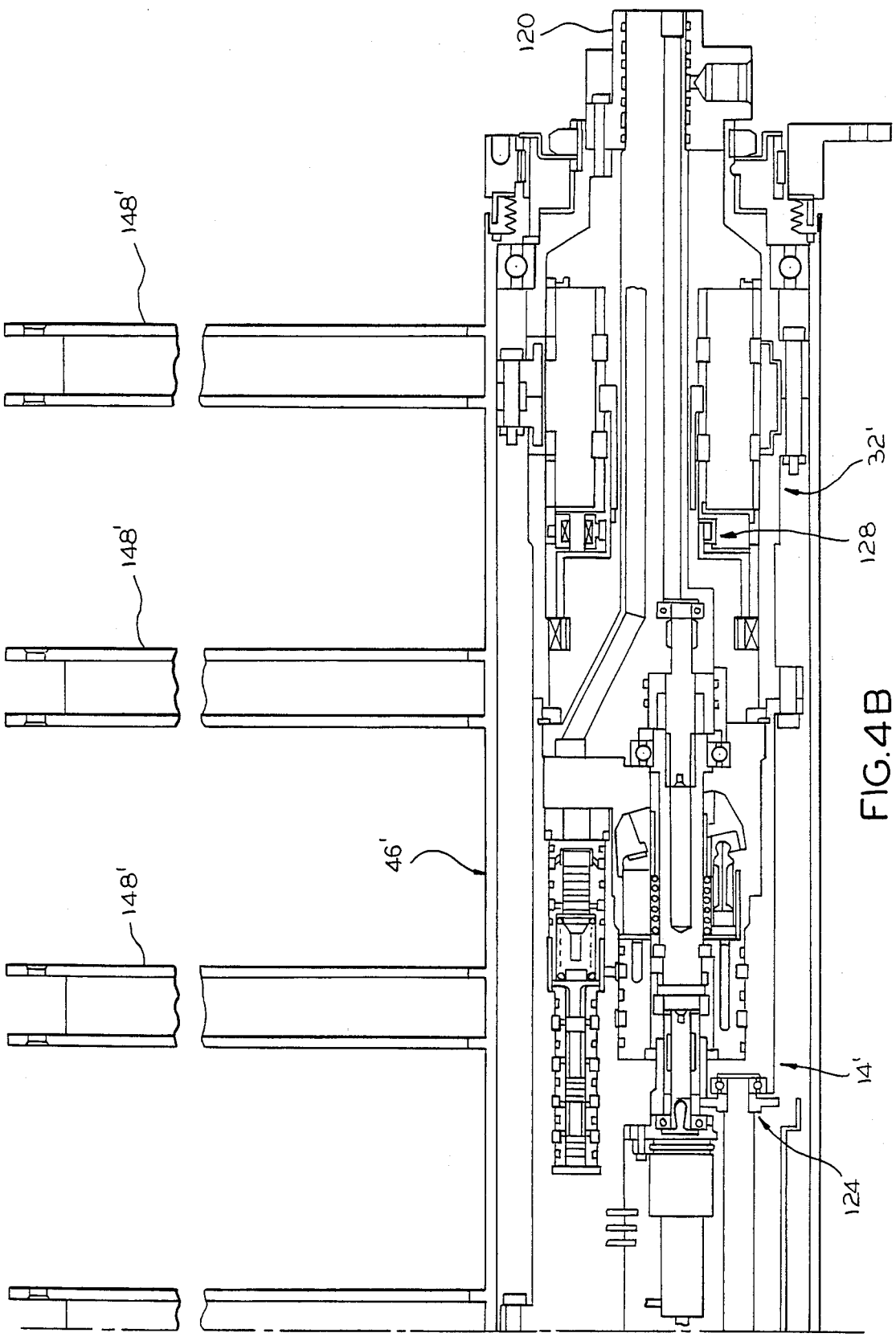
FIG. 4B is a cross-sectional view illustrating the remainder of the other form of actuation system in accordance with the present invention.
Figure 5:
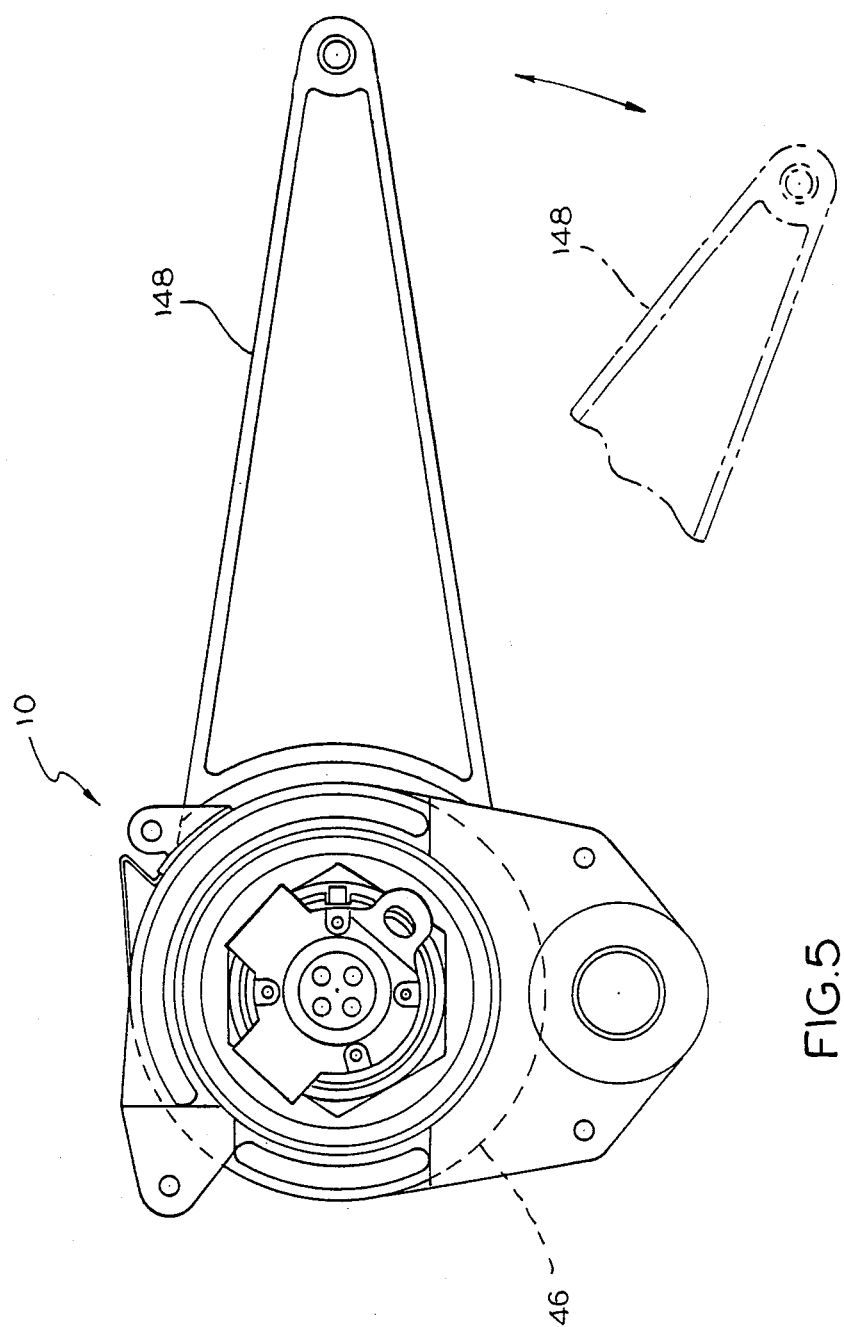
FIG. 5 is an end elevational view illustrating the operation of an actuation system in accordance with the present invention.
Figure 7:
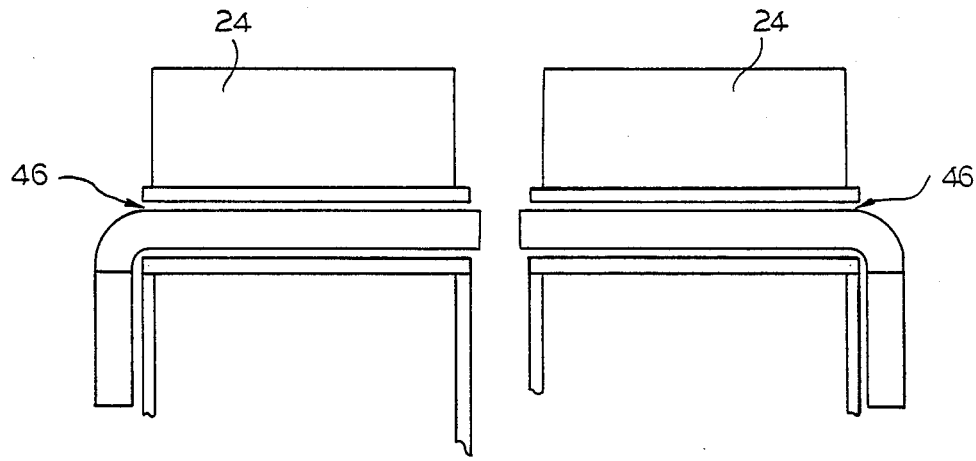
FIG. 7 is a top plan view of an actuation system for a nozzle flap of an aircraft engine.
Figure 8:
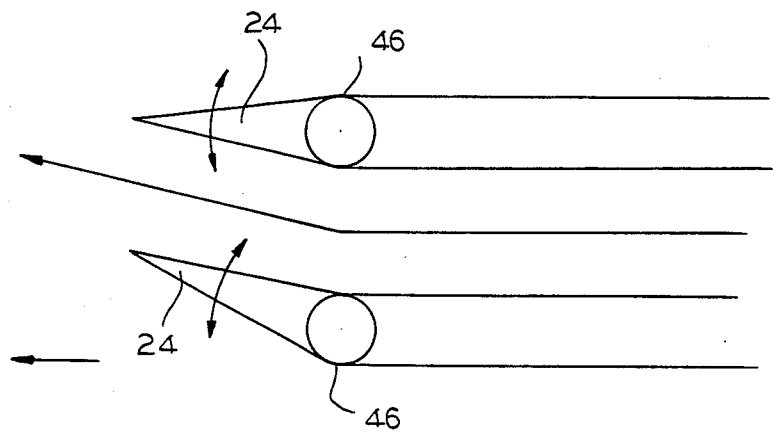
FIG. 8 is a schematic diagram illustrating operation of an actuation system in accordance with the present invention.

Referring to FIGS. 5, 7 and 8, the construction and operation of the invention can be understood. It will there be seen that the tubular support 46 is preferably provided with a plurality of output arms 148 adapted to carry the nozzle flaps 24. These output arms 148 are preferably integral with the tubular support 46 for driven movement thereby or, alternatively, as shown in FIGS. 4A and 4B, output arms 148' may be provided which are joined by means of the tubular support 46 coaxial with the remainder of the geared rotary actuator 18' for the purpose of carrying the output arms 148'. In the latter case, the tubular support 46 is bolted to the center output ring gears 20' and 22'.

The actuator system of the present invention as disclosed in both embodiments utilizes a differential planetary output stage in which the center output ring gears transmit torque to the support tube. With this arrangement, the nozzle flap or flaps can either be diverted upward or downward as illustrated in FIGS. 5 and 8.

With the present invention, the actuator system utilizes two energy efficient hydraulic motor valve packs which are torque summed at a level gear set in the case of the embodiment illustrated in FIGS. 1 and 3. set drives a sun gear of a simple planetary gear set w the ring gear of the simple planetary gear set being fixed and, therefore, the force reaction upon the planet gears creates a torque reaction to be transmitted through a planetary carrier which is integral with a sun gear of a second simple planetary gear set. As the ring gear is fixed, the force reaction upon the planet gears causes the planet carrier to transmit torque to a sun gear of a differential planetary gear set with which the planet carrier is integral and also to a torque tube that drives the sun gear of a second differential planetary gear set.

With this arrangement, loading is distributed to either end of the tubular support even though the nozzle flap is driven from a single side. The even load distribution permits downsizing of the tubular support since torsional windup normally associated with driving from a single side is eliminated moreover, this occurs even though redundant power drive units are utilized on a single side.

By providing the redundant power drive units on a single side, there is easier access for repair since the system can simply be pinned into the aircraft engine wall. Upon removal of the pins, it can be lifted out for repair. With the embodiment illustrated in FIGS. 4, 4A, 4B and 6, this is necessary due to the fact that the redundant power drive units are located internally of the tubular support.

While not specifically described herein, it will be understood and appreciated that the actuator system for both the upper and lower nozzle flaps in each engine will be identical. This arrangement only requires that hydraulic lines such as 152 and 154 (see FIG. 3) be run along a single side of the engine for connection to appropriate fittings such as 156 and 158 on the power drive units 12 and 14 (see FIG. 1) and takes full advantage of the conventional redundant hydraulic systems such as 160 (see FIG. 3) already present in the aircraft. As a result, the present invention accomplishes the goal of providing fuel savings with enhanced performance due to weight reduction.

While in the foregoing there have been set forth preferred embodiments of the invention, it is to be understood that the invention is only to be limited by the spirit and scope of the appended claims.

I claim:

1. An actuator system for a nozzle flap of an aircraft engine, comprising:

a pair of power drive units at a single location;

a geared rotary actuator driven by said power drive units through said drive transmitting gearing, said geared rotary actuator comprising a pair of axially spaced differential planetary output stages, said differential planetary output stages being operatively associated with opposite ends of said nozzle flap;

each of said differential planetary output stages having a center output ring gear in drivingly interconnected relationship with said nozzle flap, each of said differential planetary output stages also having a pair of outer fixed ring gears idsposed about said center output ring gear;

said power drive units being drivingly interconnected with said differential planetary output stages through drive transmitting gearing; and means for transmitting torque from said center output ring gears across said outer fixed ring gears to said nozzle flap;

whereby said nozzle flap is driven at opposite ends by said power drive units from a single location through said geared rotary actuator.

2. The actuator system as defined by claim 1 wherein said power drive units each comprise a hydraulic motor valve pack and said drive transmitting gearing comprises a bevel gear set.

3. The actuator system as defined by claim 2 wherein said hydraulic motor valve packs are operatively connected to an aircraft hydraulic power system, said geared rotary actuator including a pair of axially spaced input gears operatively connected to said hydraulic motor valve packs through said bevel gear set.

4. The actuator system as defined by claim 3 wherein each of said axially spaced input gears is operatively connected to one of said axially spaced differential planetary output stages for driven movement of said nozzle flap through said center output ring gears, said geared rotary actuator converting hydraulic power from said aircraft hydraulic power system to mechanical power driving said nozzle flap.

5. The actuator system as defined by claim 1 including a tubular support for said nozzle flap of said aircraft engine, said center output ring gears and said outer fixed ring gears of said geared rotary actuator defining said tubular support for said nozzle flap of said aircraft engine.

6. The actuator system as defined by claim 1 wherein each of said differential planetary output stages is driven by a simple planetary input stage, said simple planetary input stage driving each of said differential planetary output stages comprising a portion of said geared rotary actuator, said simple planetary input stage driving each of said differential planetary output stages also being operatively connected to said power drive units through said drive transmitting gearing.

7. The actuator system as defined by claim 6 wherein said drive transmitting gearing includes a bevel gear set operatively connecting said power drive units to a second simple planetary input stage, said second simple planetary input stage being operatively connected to said simple planetary input stage driving each of said differential planetary output stages.

8. The actuator system as defined by claim 7 wherein said simple planetary input stages each include a sun gear and a fixed ring gear together with a plurality of planet gears disposed therebetween, said sun gear of said simple planetary input stage being operatively connected to said planet gears of said second simple planetary input stage thrugh a planetary carrier therefor, said sun gear of said second simple planetary input stage being operatively connected to said bevel gear set through a shaft.

9. The actuator system as defined by claim 8 wherein said simple planetary input stage driving each of said differential planetary output stages includes a planetary carrier operatively connected to a sun gear of one of said differential planetry outut stages in a direct integral fashion and a planetary carrier operatively connected to a sun gear of the other of said differential planetary output stages through a torque tube.

10. The actuator system as defined by claim 9 wherein each of said differential planetary output stages also includes a plurality of planet gear shafts each carrying a center planet gear and a pair of outer planet gears, each of said center planet gears being disposed in drivingly interconnected relationship with the respective ones of said sun gears and said center output ring gears and each of said pairs of outer planet gears being disposed in drivingly interconnected relationship with the respective ones of said pairs of outer fixed ring gears, and including a support ring disposed on either side of each of said center planet gears inwardly of the respective ones of said outer planet gears to maintain said planet gears in drivingly interconnected relationship with said ring gears.

11. The actuator system as defined by claim 6 wherein said power drive units are disposed within a tube support for said nozzle flap intermediate the ends thereof and are each drivingly interconnected with one of said differential planetary output stages through a separate drive transmitting gearing and simple planetary input stage.

12. The actuator system as defined by claim 11 wherein said drive transmitting gearing includes a seperate drive gear operatively associated with each of said power drive units and a driven gear operatively associated with each of said drive gears, each of said driven gears being drivingly interconnected with a sun gear of the corresponding one of said simple planetary input stages through a torque tube, each of said simple planetary input stages also including a plurality of planet gears disposed between said sun gear and a fixed ring gear and a planetary carrier operatively connected to a sun gear of the corresponding one of said differential planetary output stages.

13. The actuator system as defined by claim 12 wherein each of said differential planetary output stages also includes a plurality of planet gear shafts each carrying a center planet gear and a pair of outer planet gears, each of said center planet gears being disposed in drivingly interconnected relationship with the respective ones of said sun gears and said center output ring gears and each of said pairs of outer planet gears being disposed in drivingly interconnected relationship with the respective ones of said pairs of outer fixed ring gears, and including a support ring disposed on either side of each of said center planet gears inwardly of the respective ones of said outer planet gears to maintain said planet gears in drivingly interconnected relationship with said ring gears.

14. The actuator system as defined by claim 11 wherein said center output ring gears and said tube support are supported relative to said outer fixed ring gears on ball bearings.

15. The actuator system as defined by claim 1 wherein each of said differential planetary output stages is formed such that one of said outer fixed ring gears and center output ring gears has an arcuate slot and the other of said outer fixed ring gears and center output ring gear has a fork extending through said arcuate slot to define said torque transmitting means.

* * * * *